June 1, 1965
T. NOVACK
3,186,817
LIQUID DELIVERY METHOD
Filed Sept. 21, 1961
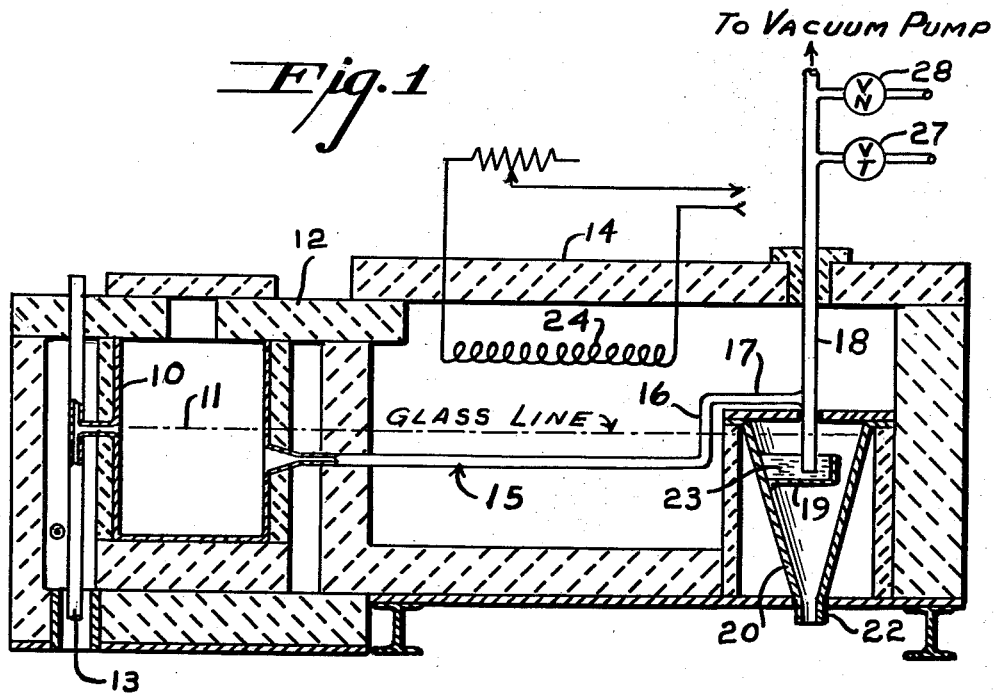
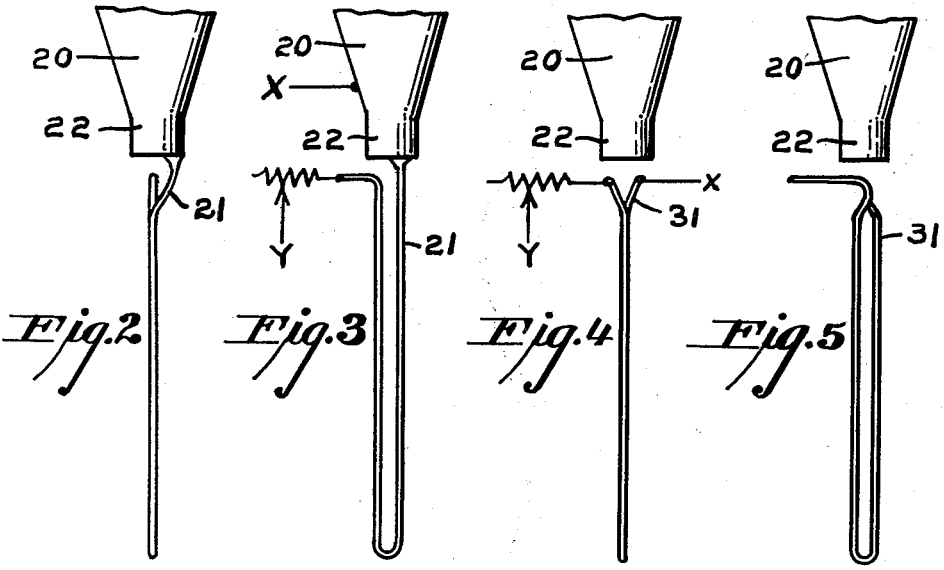
INVENTOR.
THEODORE NOVACK
BY Clarence R. Patty, Jr.
ATTORNEY

United States Patent Office 3,186,817
Patented June 1, 1965

3,186,817
LIQUID DELIVERY METHOD
Theodore Novack, Big Flats, N.Y., assignor to Corning Glass Works, Corning, N.Y., a corporation of New York
Filed Sept. 21, 1961, Ser. No. 139,809
4 Claims. (Cl. 65—130)

The present invention relates to methods of and apparatus for the feeding of thermoplastic liquids at a constant easily varied, but stable flow rate through a wide range of viscosities and further to a method wherein feeding can be discontinued and resumed at will.

By way of example, in certain glass forming operations it is desirable to periodically or continuously feed a stream of glass from a passage, whose entrance is submerged in a suitable supply body, to a delivery position at a predetermined rate of flow; to be able to change the rate of flow to meet varying conditions; and to at times wholly discontinue the flow. Obviously the rate of issuance of a stream of molten glass in part depends upon its viscosity, the level of the passage entrance relative to that of the top or head of the supply body, the diameter of the flow passage, its length and the glass density.

According to the invention, liquid is issued from the submerged passage entrance through a metering tube which provides a path that reaches a height above the top level of the supply body and terminates in communication with a vertically disposed chamber formed by a delivery tube, in a region intermediate its ends. The bottom end of such delivery tube terminates in a pool from liquid of the supply body which is maintained in a region well below the level of the delivery end of the metering tube, and which is conveniently confined within a container formed in a tubulated delivery funnel. The delivery tube has made available to it a source of vacuum so that suction can be created therein and in the adjoining metering tube so as to withdraw glass from the supply body thereof and over the crest of the path afforded by the metering tube, thereby permitting the liquid glass to flow by gravity into the delivery tube and join the liquid in the pool. The liquid overflows the container retaining such pool at a rate dependent upon the head of liquid within the delivery tube, the viscosity of such liquid, its density and the degree of vacuum maintained within the delivery tube above the level of liquid therein. Also, the flow of such liquid may be wholly discontinued by breakage of such vacuum. Moreover, there may be, according to the invention, an electrically heated collector wire depending from the funnel tubulation or from a region just below such tubulation to collect droplets issued from such pool and unite them into an uninterrupted stream or column of liquid so long as an appropriate degree of vacuum is maintained above the glass within the delivery tube. Need for the collector wire does not always exist, but the particular liquid being fed may be of such low viscosity as to otherwise allow the normally high surface tension of glass to cause the stream to separate into droplets as it leaves the pool and issue from the funnel tube in such discontinuous form.

For a better understanding of the invention reference will hereinafter be made to the accompanying drawing depicting the invention as applied to the feeding of molten glass.

FIG. 1 is a vertical section depicting a structure in which a container of molten glass is within a heated muffle furnace and feeding apparatus embodying the invention is contained within a suitably heated enclosure.

FIGS. 2 and 3 are different side elevational views, on an enlarged scale, of a fragment of the tubulated funnel of FIG. 1 showing attached thereto an electrically heated collector wire embodying an alternative feature of the invention.

FIGS. 4 and 5 are views similar to FIGS. 2 and 3 showing the electrically heated collector wire closely associated with the funnel tubulation, rather than being attached thereto.

In the drawing 10 designates a tank of molten glass 11 within a muffle furnace 12 having an overflow pipe 13. Extending horizontally from tank 10 within an enclosure 14, suitably heated as by a heater element 24, is a metering tube 15 having a vertical run 16 terminating above the glass line and having a further horizontal run 17 in communication with a vertically disposed delivery tube 18, intermediate its ends. Tube 18, at its bottom end, terminates in a pool of molten glass 23 within a weir or open top shallow container 19 connected to and surrounded by a funnel tube 20. In the modified showing in FIGS. 2 and 3, an electrically heated glass collector wire 21 is secured to the tubulation 22 of the funnel tube 20. Alternatively, a similar wire 31, independently supported by any suitable means (not shown), is arranged below the tubulation 22 of the funnel tube 20.

The top end of delivery tube 18 is in communication with a vacuum source. Such tube also has a valve 27 connected thereto which may be quickly opened to atmosphere to destroy the vacuum therein when glass flow is to cease. A needle valve 28 connected to tube 18 is provided as a convenient means of bleeding such tube to the extent necessary to obtain the exact degree of suction for a desired rate of feed.

For the purpose of describing the operation of the system shown it will be assumed that valve 27 is open. Under these circumstances atmospheric pressure prevails in tube 18, and molten glass 23 in container 19 is simply sealing the lower end of delivery tube 18, which is open at its upper end to the atmosphere. Glass 11 from tank 10 will occupy tube 15 and terminate in its vertical run 16 at the glass line level, and as a result no flow is had through delivery tube 18.

By closing valve 27 and by suitable adjustment of needle valve 28 the degree of vacuum can be attained in tube 18 which will produce a desired flow rate.

The lowest flow rate obtainable is that created when the degree of vacuum applied to the upper end of tube 18 is just sufficient to raise the level of glass in run 16 so that it may flow through run 17 and into tube 18. Obviously some small amount of glass 23 will, under these circumstances, initially be drawn from container 19 into the tube 18. As the head of glass in tube 18 builds up, glass starts to issue from tube 18, and container 19 will be filled to overflowing and will continue to overflow at a rate to maintain a balance with that entering the tube 18. The degree of reduced pressure in tube 18 is always maintained at such a level so as to be insufficient to prevent glass flow from delivery tube 18, which flow is produced and regulated by the head of glass created in such tube by the degree of such reduced pressure.

The rate of glass flow can be increased by further closing valve 28, until the partial vacuum in tube 18 is such that the head of glass in tube 18 reaches the top of the bore of horizontal run 17. Any further increase of suction in tube 18 will be ineffective to increase the rate of flow, and such flow which will thereafter be determined entirely by the length of tube 15, the head of glass in the tank 11 and of course its density and viscosity.

When it is desired to discontinue the glass flow, irrespective of its rate of flow, this can be done by opening valve 27 to atmosphere, thus immediately discontinuing the withdrawal of glass from tank 10 into tube 18. The glass remaining within such tube will of course continue to flow therefrom by gravity into container 19 which will cease to overflow when substantially all of the glass in tube 18 has drained therefrom. Obviously by periodically opening and closing valve 27 predetermined charges of glass may be intermittently issued into funnel 20. Alternatively, the rate of flow may be varied by manipulation of valve 28. As previously stated to assure the issuance of glass as a stream, especially when the glass is of extremely low viscosity, a collector wire such as 21 or 31 is provided about which a column of glass accumulates and from the free lower end of which the glass flows in a stream even though the viscosity and rate of flow of the glass may be so low as to issue from the container 19 and encounter the wire 21 or 31 in droplets. As will be understood, heating current is passed through the collector wire 21 or 31 from a suitable source, connected to terminals such as X and Y, as required to maintain the accumulated glass at the desired viscosity as it passes over the collector wire.

As will be appreciated, the invention is not limited to the precise structures shown. For example, the metering tube can follow any of various paths between the delivery tube 18 and tank 10 so long as some section of such tube is above the level of glass in tank 10; and, if desired, the entrance end of such tube can be immersed in the glass of tank 10 directly from above the pool of glass 11 therein.

What is claimed is:

1. A method of controlling the rate of flow of a liquid so as to provide uniform desired flow rates which comprises, creating an initial vacuum to withdraw liquid from a source thereof through a confined space to a height above the surface of such source, maintaining the confined space completely full of such liquid during the application of the initial vacuum, flowing such liquid from the confined space into a vertically disposed chamber intermediate its vertical extent, maintaining a pool of the liquid about a lower outlet end of such chamber to close such outlet end to the atmosphere, varying the degree of vacuum applied to produce a desired flow rate of the liquid through the confined space, and thereby forming a predetermined head of such liquid within the chamber so as to provide a uniform desired delivery rate therefrom.

2. A method of controlling the rate of flow of a liquid which comprises, withdrawing liquid from a source thereof through a confined space by the application of an initial vacuum, continuously draining liquid from the confined space by gravity into a vertically extending chamber intermediate the ends thereof, maintaining a lower outlet end of such chamber submerged within a pool of such liquid, forming a head of the liquid within the lower end of such chamber, adjusting the degree of vacuum applied to control the rate of flow through the confined space and thereby maintain a predetermined head within such chamber, and delivering the liquid from the lower end of such chamber at a constant desired flow rate predicated upon the head maintained therein by the degree of vacuum.

3. A method of controlling the rate of feeding molten glass which comprises, applying an initial vacuum to withdraw liquid glass to be fed from a suitable source thereof through a confined space to a height above the level of such source, flowing such liquid from the confined space by gravity into a vertically-extending chamber intermediate its ends, maintaining a lower outlet end of such chamber submerged within a pool of such liquid, forming a head of the liquid glass within the lower end of such chamber, adjusting the height of the head of such liquid within the chamber to a desired level to provide a predetermined flow rate from the outward end thereof, varying the degree of applied vacuum so as to produce the necessary rate of flow through the confined space and maintain a desired constant head within the chamber, overflowing the pool at the lower end of such chamber by the desired flow emanating therefrom, and collecting the overflown liquid glass for delivery to a desired feeding point.

4. A method as defined in claim 3 including the step of delivering the collected liquid glass and maintaining it in a molten condition as a continuous stream along an electrically heated guide to the feeding point.

References Cited by the Examiner
UNITED STATES PATENTS

| | | | |
|---|---|---|---|
| 848,422 | 3/07 | Wynne. | |
| 916,314 | 3/09 | Hitt | 137—147 X |
| 1,068,643 | 7/13 | Franklin. | |
| 1,222,243 | 4/17 | Peiler. | |
| 1,796,929 | 3/31 | Howard | 65—130 |
| 1,797,206 | 3/31 | Howard | 65—130 |
| 1,956,171 | 4/34 | Hitner | 65—327 X |
| 1,999,749 | 4/35 | Bates | 65—130 |
| 2,062,620 | 12/36 | Stewart | 65—130 |
| 2,141,425 | 12/38 | Wadsworth | 65—329 X |
| 2,310,715 | 2/43 | Soubier | 65—130 X |
| 2,335,386 | 11/43 | Brady | 65—326 X |

FOREIGN PATENTS 17,933 10/90 Great Britain.
of 1889

DONALL H. SYLVESTER, *Primary Examiner.*